United States Patent
McAlice et al.

(10) Patent No.: US 9,249,732 B2
(45) Date of Patent: Feb. 2, 2016

(54) PANEL SUPPORT HANGER FOR A TURBINE ENGINE

(71) Applicant: United Technologies Corporation, Hartford, CT (US)

(72) Inventors: Timothy J. McAlice, Jupiter, FL (US); Carlos G. Figueroa, Wellington, FL (US)

(73) Assignee: United Technologies Corporation, Hartford, CT (US)

( * ) Notice: Subject to any disclaimer, the term of this patent is extended or adjusted under 35 U.S.C. 154(b) by 503 days.

(21) Appl. No.: 13/672,124

(22) Filed: Nov. 8, 2012

(65) Prior Publication Data

US 2014/0090399 A1 Apr. 3, 2014

Related U.S. Application Data

(60) Provisional application No. 61/707,333, filed on Sep. 28, 2012.

(51) Int. Cl.
| | | |
|---|---|---|
| *F23R 3/00* | (2006.01) | |
| *F23R 3/60* | (2006.01) | |
| *F01D 25/28* | (2006.01) | |
| *F02C 7/20* | (2006.01) | |
| *F16B 5/06* | (2006.01) | |
| *F02K 1/82* | (2006.01) | |
| *F02K 1/80* | (2006.01) | |

(52) U.S. Cl.
CPC . *F02C 7/20* (2013.01); *F01D 25/28* (2013.01); *F02K 1/82* (2013.01); *F16B 5/065* (2013.01); *F23R 3/002* (2013.01); *F23R 3/60* (2013.01); *F02K 1/80* (2013.01); *F05D 2300/5021* (2013.01)

(58) Field of Classification Search
CPC ....... F01D 25/24; F01D 25/246; F23R 3/002; F23R 3/60; F02C 7/20; F02K 1/80; F02K 1/82; F16B 5/065
See application file for complete search history.

(56) References Cited

U.S. PATENT DOCUMENTS

| | | | |
|---|---|---|---|
| 3,164,389 A | | 1/1965 | Thomas |
| 4,025,227 A | * | 5/1977 | Greenberg et al. ............ 415/160 |
| 4,454,711 A | * | 6/1984 | Ben-Porat ....................... 60/800 |
| 4,506,648 A | | 3/1985 | Roberts |
| 4,522,557 A | * | 6/1985 | Bouiller et al. ................ 415/115 |
| 4,696,431 A | | 9/1987 | Buxe |
| 4,722,631 A | * | 2/1988 | Tagami ........................ 403/133 |
| 4,903,476 A | | 2/1990 | Steber et al. |
| 4,944,151 A | | 7/1990 | Hovnanian |

(Continued)

FOREIGN PATENT DOCUMENTS

| | | |
|---|---|---|
| EP | 0517561 | 10/1994 |
| EP | 0972905 | 1/2000 |
| EP | 1887209 A2 | 2/2008 |

OTHER PUBLICATIONS

Search report for EP13841743.1 dated Oct. 9, 2015.

*Primary Examiner* — Phutthiwat Wongwian
*Assistant Examiner* — Rene Ford
(74) *Attorney, Agent, or Firm* — O'Shea Getz P.C.

(57) ABSTRACT

A support hanger is provided for a turbine engine. The support hanger includes a pin with a pin head, a retainer and a flexible seal. The retainer is pivotally connected to the pin head. The retainer includes a seal bearing surface facing towards the pin head. The seal includes a retainer bearing surface sealingly engaging the seal bearing surface.

18 Claims, 5 Drawing Sheets

(56) References Cited

U.S. PATENT DOCUMENTS

| | | | |
|---|---|---|---|
| 5,059,055 A | 10/1991 | DeGress et al. | |
| 5,069,034 A | 12/1991 | Jourdain et al. | |
| 5,083,424 A | 1/1992 | Becker | |
| 5,088,279 A * | 2/1992 | MacGee | 60/226.1 |
| 5,101,624 A | 4/1992 | Nash et al. | |
| 5,103,639 A | 4/1992 | Wolf | |
| 5,329,763 A | 7/1994 | Ibarreche Mendia et al. | |
| 5,431,534 A * | 7/1995 | Charbonnel | 415/118 |
| 5,501,071 A | 3/1996 | Ansart et al. | |
| 5,596,870 A | 1/1997 | Dillard et al. | |
| 5,813,609 A | 9/1998 | Ellerhorst | |
| 6,041,590 A | 3/2000 | Hayton et al. | |
| 6,067,793 A | 5/2000 | Urruela et al. | |
| 6,199,371 B1 | 3/2001 | Brewer et al. | |
| 6,945,496 B2 | 9/2005 | Reniau | |
| 7,017,334 B2 | 3/2006 | Mayer et al. | |
| 7,024,863 B2 * | 4/2006 | Morenko | 60/796 |
| 7,338,244 B2 * | 3/2008 | Glessner et al. | 411/401 |
| 7,493,771 B2 * | 2/2009 | Lohmueller et al. | 60/796 |
| 7,637,110 B2 * | 12/2009 | Czachor et al. | 60/796 |
| 7,721,522 B2 | 5/2010 | Farah et al. | |
| 7,861,535 B2 * | 1/2011 | Figueroa et al. | 60/796 |
| 7,866,158 B2 | 1/2011 | Murphy | |
| 8,197,187 B2 * | 6/2012 | Walker et al. | 415/118 |
| 8,418,473 B2 * | 4/2013 | Petty et al. | 60/796 |
| 8,661,835 B2 * | 3/2014 | Farah et al. | 60/798 |
| 2004/0032089 A1 | 2/2004 | Conete et al. | |
| 2005/0155352 A1 | 7/2005 | Agg | |
| 2005/0210864 A1 | 9/2005 | Lapergue et al. | |
| 2006/0137324 A1 | 6/2006 | Farah | |
| 2006/0179816 A1 | 8/2006 | Murphy et al. | |
| 2007/0003411 A1 | 1/2007 | Manzoori | |
| 2007/0119181 A1 | 5/2007 | Lohmueller et al. | |
| 2009/0077978 A1 | 3/2009 | Figueroa et al. | |
| 2009/0293498 A1 | 12/2009 | Petty et al. | |
| 2013/0318979 A1 * | 12/2013 | Kramer et al. | 60/752 |
| 2013/0319007 A1 * | 12/2013 | Peters | 60/805 |
| 2014/0047849 A1 * | 2/2014 | Kramer et al. | 60/796 |
| 2014/0048166 A1 * | 2/2014 | Kramer et al. | 138/149 |

* cited by examiner

PANEL SUPPORT HANGER FOR A TURBINE ENGINE

This application claims priority to U.S. Provisional Appln. No. 61/707,333 filed Sep. 28, 2012, which is hereby incorporated by reference.

BACKGROUND OF THE INVENTION

1. Technical Field

This disclosure relates generally to a panel support hanger and, more particularly, to a support hanger for flexibly connecting panels such as, for example, a turbine engine exhaust liner and a turbine engine exhaust duct.

2. Background Information

A turbine engine may include a compressor section, a combustor section, a turbine section, an augmentor section and/or an exhaust section, which are sequentially arranged between an airflow inlet and an airflow exhaust. The exhaust section may include a tubular exhaust liner arranged within and connected to a tubular exhaust duct. An exhaust gas path extends axially through the exhaust section, adjacent to a radial inner side of the exhaust liner. A cooling gas path also extends axially through the exhaust section, between a radial outer side of the exhaust liner and a radial inner side of the exhaust duct.

Exhaust gas directed through the exhaust gas path may have a significantly higher temperature than that of cooling gas directed through the cooling gas path. These gases may also have different pressures. The exhaust liner and the exhaust duct therefore may be subject to different temperature and/or pressure gradients during turbine engine operation. These different temperature and pressure gradients may cause the exhaust liner and the exhaust duct to move (e.g., deflect, expand, contract, shift, etc.) relative to one another.

There is a need for a support hanger that connects a turbine engine exhaust liner to a turbine engine exhaust duct, while also accommodating movement therebetween.

SUMMARY OF THE DISCLOSURE

According to an aspect of the disclosure, a support hanger is provided for a turbine engine. The support hanger includes a retainer, a flexible seal and a pin with a pin head. The retainer is pivotally connected to the pin head. The retainer includes a seal bearing surface facing towards the pin head. The seal includes a retainer bearing surface sealing that engages the seal bearing surface.

According to another aspect of the disclosure, a turbine engine section is provided that includes a movable first panel, a second panel, a pin head, a retainer, and an annular flexible seal. The pin head is fixedly connected to the first panel. The retainer is engaged pivotally to the head. The retainer includes a seal bearing surface facing towards the pin head. The seal is engaged sealably between the seal bearing surface and the second panel.

The seal may extend radially between a first seal segment and a second seal segment. The first seal segment is axially displaced relative to the second seal segment, and the second seal segment includes the retainer bearing surface.

The seal may include a first seal segment, a second seal segment and a transition segment extending radially and axially between the first seal segment and the second seal segment. The second seal segment includes the retainer bearing surface.

A collar may be included, which has a threaded first collar segment and a second collar segment pivotally connected to the pin head. The retainer has a retainer bore, and the first collar segment is mated with a threaded portion of the retainer bore.

The pin head may have a parti-spherical collar bearing surface. The second collar segment may include a parti-spherical pin bearing surface that engages the collar bearing surface to pivotally connect the collar to the pin head. The pin bearing surface may at least partially define a collar bore that extends axially into the collar. The collar bearing surface may be convex. The pin bearing surface may be concave.

One or more slots may extend radially though a sidewall of the collar, and axially through the pin engagement segment. The collar may include an intermediate segment axially connecting the first collar segment and the second collar segment. The one or more slots may extend axially into the intermediate segment to respective slot ends.

The retainer may include a first retainer segment and a second retainer segment. The first retainer segment includes the seal bearing surface and the threaded portion of the retainer bore. At least a portion of the second collar segment is nested within a portion of the retainer bore in the second retainer segment.

The first retainer segment may include a flange and a base. The flange extends radially out from the base and includes the panel bearing surface. The base includes the threaded portion of the retainer bore. The flange may have an arcuate cross-sectional geometry.

The retainer may include a plurality of torquing features arranged around the retainer base. The collar may include an anti-rotation feature arranged at an end of the first collar segment.

A (e.g., cooling) gas path may be defined between the first and the second panel. The first panel may be a tubular, dual wall turbine engine exhaust liner. The second panel may be a tubular turbine engine exhaust duct.

The pin head may be arranged in the gas path. The retainer may project through the second panel.

The second panel may have a first side opposed to the first panel and an opposite second side engaged directly to the flexible seal.

The foregoing features and the operation of the invention will become more apparent in light of the following description and the accompanying drawings.

DETAILED DESCRIPTION OF THE INVENTION

Figure 1:
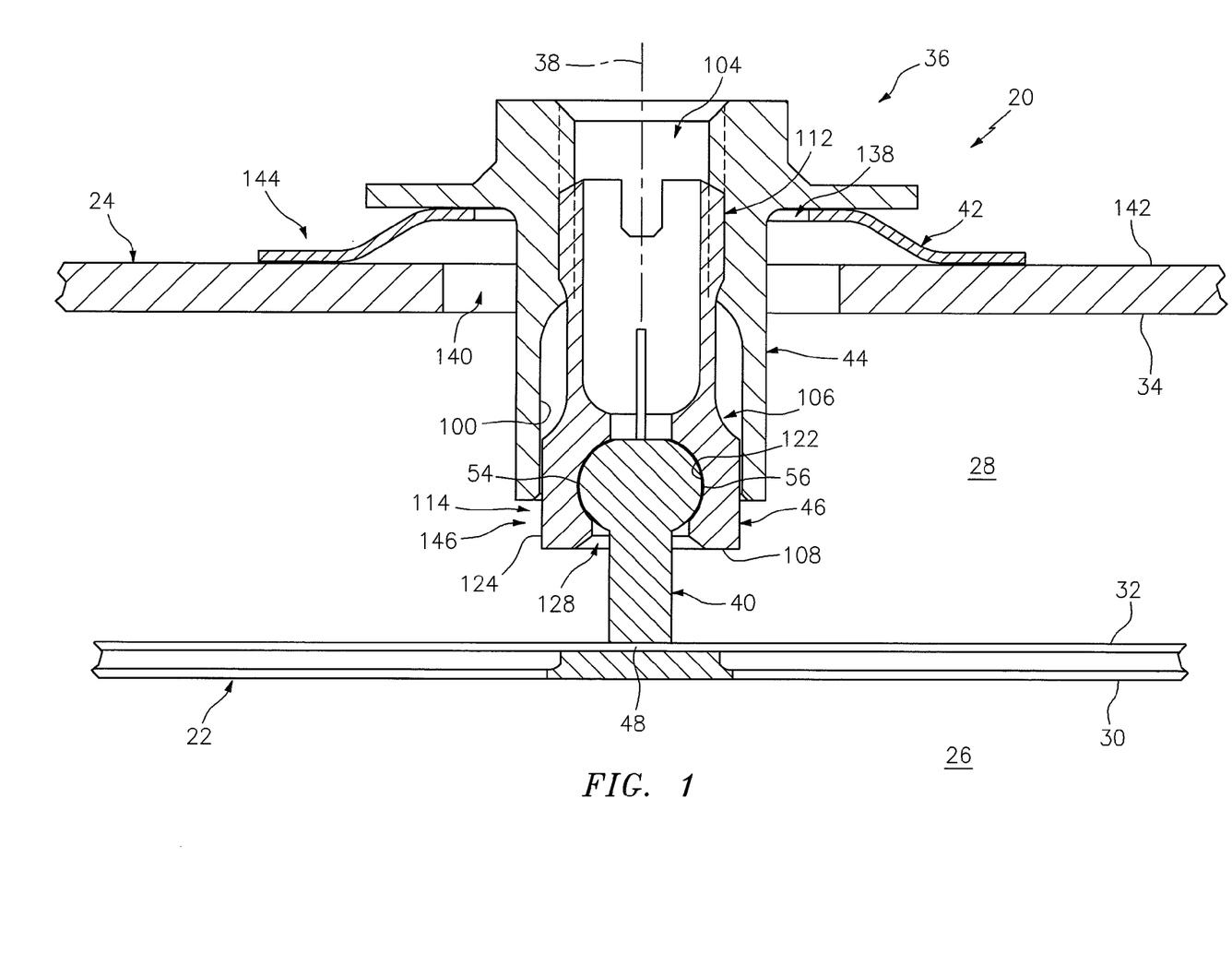
FIG. 1 is a sectional illustration of a support hanger that flexibly connects a first panel to a second panel.

A turbine engine includes a plurality of turbine engine sections. Examples of a turbine engine section include a compressor section, a combustor section, a turbine section, an augmentor section and an exhaust section. Referring to FIG. 1, at least one of the turbine engine sections 20 (e.g., the exhaust section) includes a first panel 22 (e.g., a tubular, dual wall turbine engine exhaust liner) and a second panel 24 (e.g., a tubular turbine engine exhaust duct), which form a first (e.g., exhaust) gas path 26 and a second (e.g., cooling) gas path 28. The first gas path 26 extends through the turbine engine section 20, adjacent a first (e.g., inner) side 30 of the first panel 22. The second gas path 28 extends at least partially through the turbine engine section 20, between a second (e.g., outer) side 32 of the first panel 22 and a first (e.g., inner) side 34 of the second panel 24.

The first panel 22 is connected to the second panel 24 with one or more support hangers 36. One or more of the support hangers 36 has an axial centerline 38, and includes a support hanger pin 40, a support hanger annular flexible seal 42 (e.g., annular spring diaphragm), a support hanger retainer 44 (e.g., nut) and a support hanger collar 46.

Figure 2:
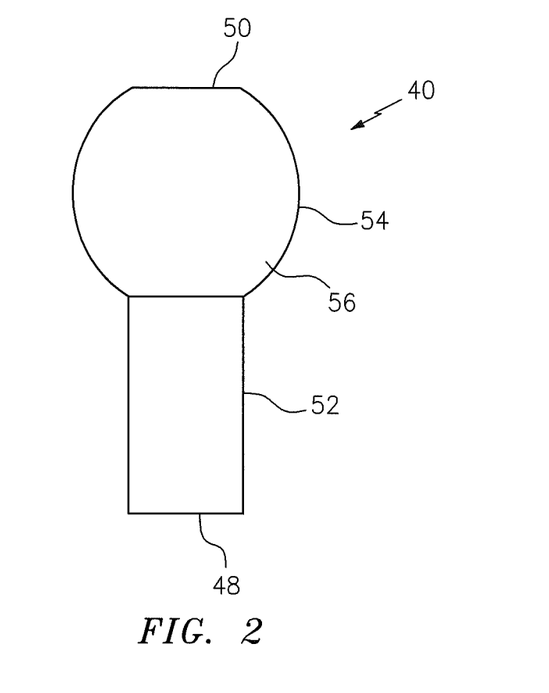
FIG. 2 is a sectional illustration of a support hanger pin included in the support hanger of FIG. 1.

Referring to FIG. 2, the pin 40 extends axially between a first pin end 48 and a second pin end 50. The pin 40 includes a pin shaft 52 that extends axially between the first pin end 48 and a substantially spherical pin head 54. The pin head 54 is arranged at (e.g., proximate or carries) the second pin end 50, and includes a (e.g., convex) parti-spherical collar bearing surface 56.

Figure 3:
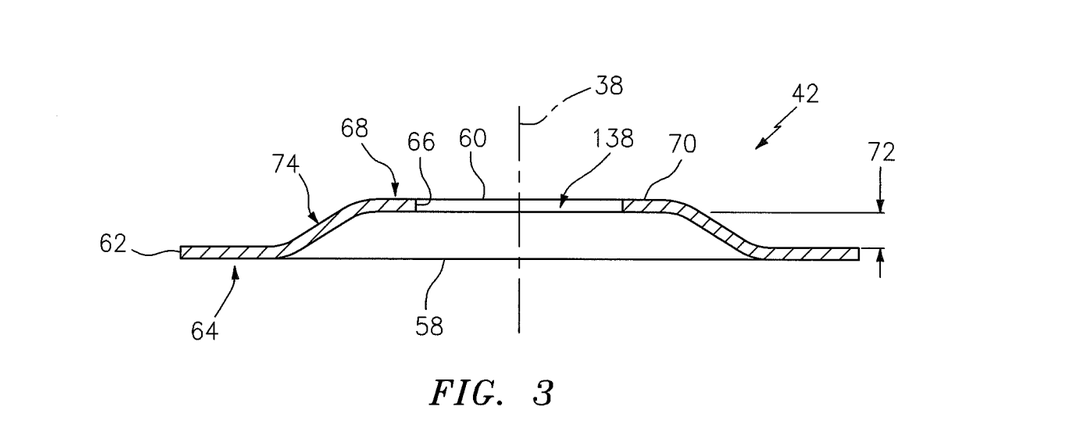
FIG. 3 is a sectional illustration of a support hanger flexible seal included in the support hanger of FIG. 1.

Referring to FIG. 3, the flexible seal 42 extends circumferentially around the centerline 38, and axially between a first seal end 58 and a second seal end 60. The flexible seal 42 also extends radially between a radial outer perimeter 62 of a first seal segment 64 and a radial inner perimeter 66 of a second seal segment 68. The first seal segment 64 is arranged at the first seal end 58. The second seal segment 68 includes a retainer bearing surface 70 arranged at the second seal end 60. In the flexible seal 42 embodiment of FIG. 3, the first seal segment 64 is axially displaced relative to the second seal segment 68 by an axial distance 72. A transition segment 74 extends, for example, axially and radially between the first seal segment 64 and the second seal segment 68. The flexible seal 42 may be constructed from metals such, for example, nickel and/or titanium alloy. The present disclosure, of course, is not limited to any particular seal materials.

Figure 4:
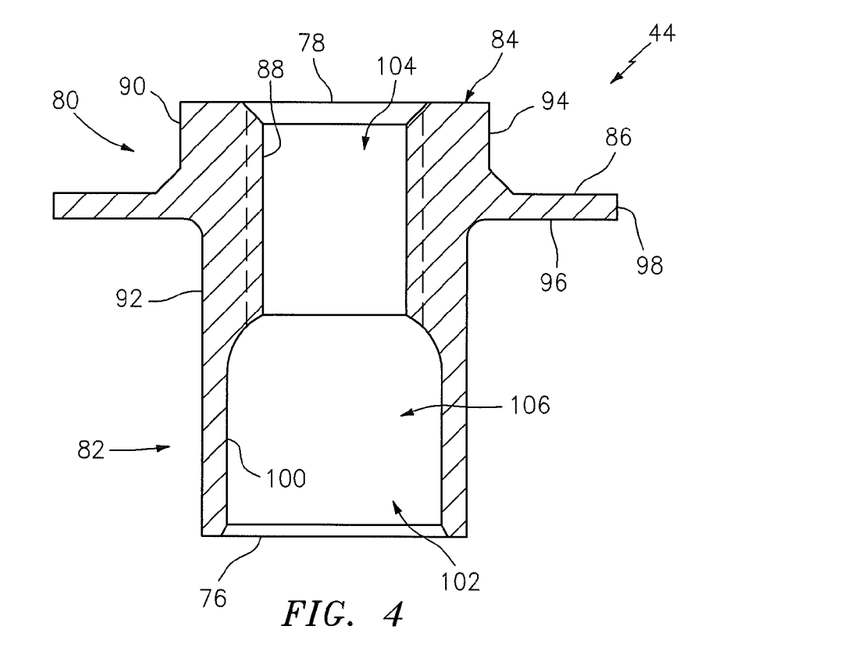
FIG. 4 is a sectional illustration of a support hanger retainer included in the support hanger of FIG. 1.
Figure 5:
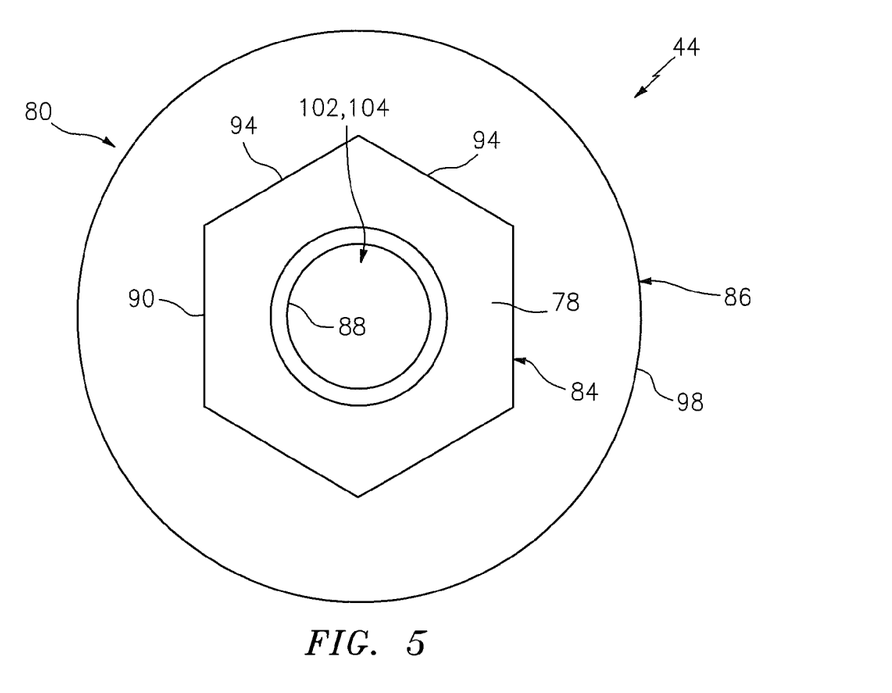
FIG. 5 is an illustration of an end of the retainer of FIG. 4.

Referring to FIGS. 4 and 5, the retainer 44 extends axially between a first retainer end 76 and a second retainer end 78. The retainer 44 includes a first retainer segment 80 and a second retainer segment 82. The first retainer segment 80 includes a base 84 and an annular flange 86. The base 84 extends axially between the second retainer end 78 and the second retainer segment 82. The base 84 also extends radially between a threaded inner surface 88 and an outer surface 90 as well as an outer surface 92. The outer surface 90 may include a plurality of torquing features 94 (e.g., flats) arranged, for example, in a hexagonal bolt head configuration. The flange 86 includes an annular seal bearing surface 96 that extends radially from the outer surface 92 to a distal flange end 98. The second retainer segment 82 extends axially between the first retainer end 76 and the base 84. The second retainer segment 82 also extends radially between an inner surface 100 and the outer surface 92.

The retainer 44 also includes a retainer bore 102 that extends axially through the retainer 44 between the first retainer end 76 and the second retainer end 78. A threaded portion 104 of the retainer bore 102 is defined by the inner surface 88. A second portion 106 of the retainer bore 102 is defined by the inner surface 100. A diameter of this second portion 106 of the retainer bore 102 may be greater than that of the threaded portion 104 of the retainer bore 102.

Figure 6:
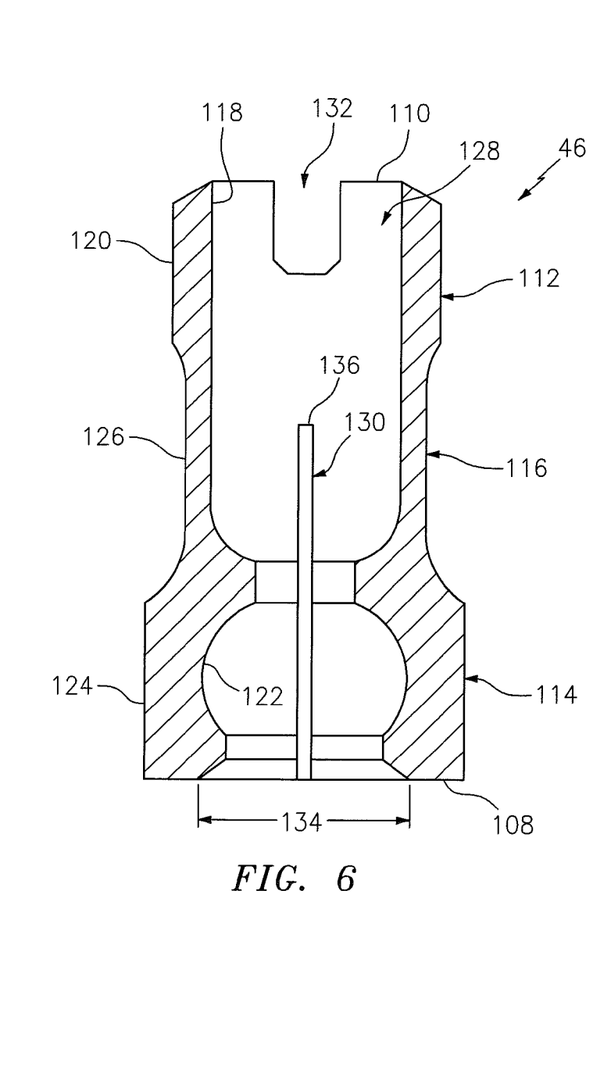
FIG. 6 is a sectional illustration of a support hanger collar included in the support hanger of FIG. 1.
Figure 7:
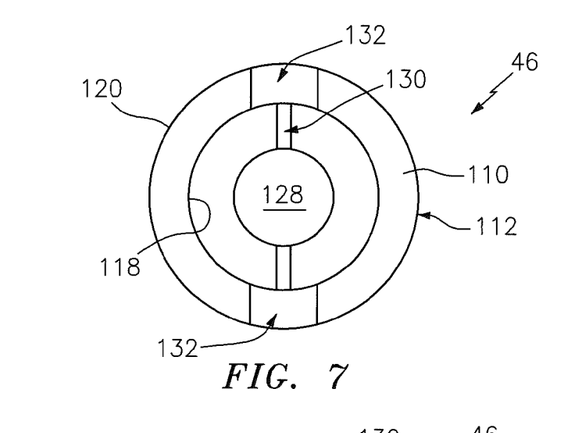
FIG. 7 is an illustration of an end of the collar of FIG. 6.
Figure 8:
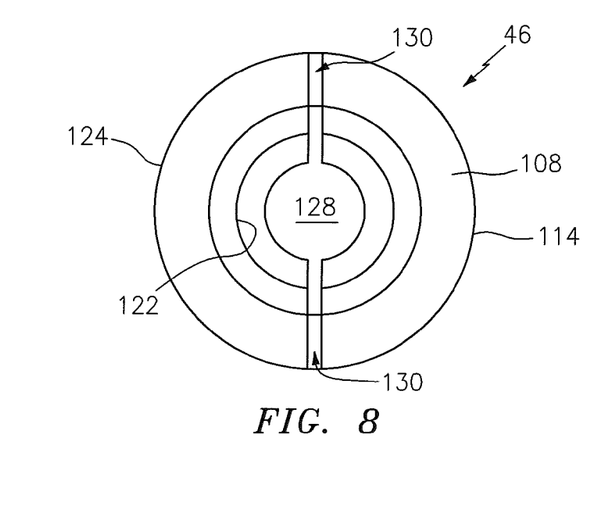
FIG. 8 is an illustration of another end of the collar of FIG. 6.

Referring to FIGS. 6 to 8, the collar 46 extends axially between a first collar end 108 and a second collar end 110. The collar 46 includes a threaded first collar segment 112, a second collar segment 114 and an intermediate segment 116. The threaded first collar segment 112 extends axially between the second collar end 110 and the intermediate segment 116. The threaded first collar segment 112 also extends radially between an inner collar surface 118 and an outer threaded collar surface 120. The second collar segment 114 extends axially between the first collar end 108 and the intermediate segment 116. The second collar segment 114 also extends radially between a (e.g., concave) parti-spherical pin bearing surface 122 and an outer retainer engagement surface 124. The intermediate segment 116 axially connects the threaded first collar segment 112 and the second collar segment 114, and extends radially between the inner collar surface 118 and an outer collar surface 126.

The collar 46 also includes a collar bore 128, one or more relief (e.g., collar expansion) slots 130, and an anti-rotation feature 132. The collar bore 128 extends axially into (e.g., through) the collar 46 from the first collar end 108 to the second collar end 110, and is defined by the inner collar surface 118 and the pin bearing surface 122. The relief slots 130 are arranged circumferentially around the collar bore 128, and are configured to permit a diameter 134 of the collar bore 128 at the first collar end 108 to temporarily or resiliently increase during support hanger 36 assembly. The relief slots 130, for example, extend axially through the second collar segment 114 and into the intermediate segment 116 to respective distal slot ends 136. The relief slots 130 also extend radially through a sidewall of the collar 46. The anti-rotation feature 132 may be configured as, for example, one or more slots that extend axially into the threaded first collar segment 112 at the second collar end 110.

Referring to FIG. 1, the first pin end 48 is fixedly mounted (e.g., fastened, welded, brazed or otherwise attached) to the second side 32 of the first panel 22. The second collar segment 114 is snapped onto the pin head 54 and the pin bearing surface 122 engages (e.g., contacts) the collar bearing surface 56, which pivotally connects the collar 46 to the second pin end of the pin 40. The threaded first collar segment 112 projects through an aperture 138 in the flexible seal 42 and a support hanger aperture 140 in the second panel 24. The threaded first collar segment 112 is mated with the threaded portion 104 of the retainer bore, which connects the collar 46 and the retainer 44 together. The retainer 44 is seated against the second seal segment 68 and the seal bearing surface 96 engages the retainer bearing surface 70. The first seal segment 64 is fixedly mounted (e.g., fastened, welded, brazed or otherwise attached) to a second side 142 of the second panel 24, which pivotally mounts the retainer 44 to the second panel 24. At least a portion of the second collar segment 114 is nested within the second portion 106 of the retainer bore, which may prevent the second collar segment 114 from disconnecting from the pin head 54. The surface 100, for example, may prevent the retainer engagement surface 124 from moving radially outwards, which may prevent the diameter (see FIG. 6) of the collar bore 128 at the first collar end 108 from increasing.

Figure 9:
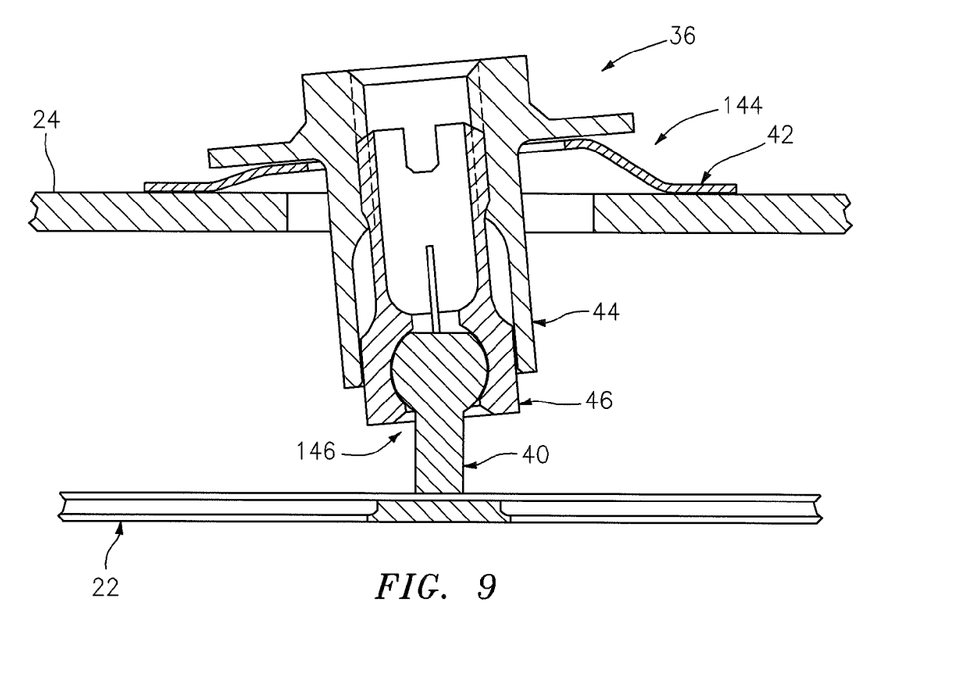
FIG. 9 is another sectional illustration of the support hanger of FIG. 1.

Gas (e.g., exhaust gas) directed through the first gas path 26 may have a significantly higher temperature than that of gas (e.g., cooling gas) directed through the second gas path 28. These gases within the first and the second gas paths 26 and 28 may also have different pressures. The first and the second panels 22 and 24 therefore may be subject to different temperature and/or pressure gradients during turbine engine operation. These different temperature and pressure gradients may cause the first panel 22 and the second panel 24 to move (e.g., deflect, expand, contract, shift, etc.) relative to one another as illustrated, for example, in FIG. 9. The support hangers 36 may accommodate such movement via the pivoting connection 144 between the retainer 44 and the second panel 24 and/or the pivoting connection 146 between the pin 40 and the collar 46.

Figure 10:
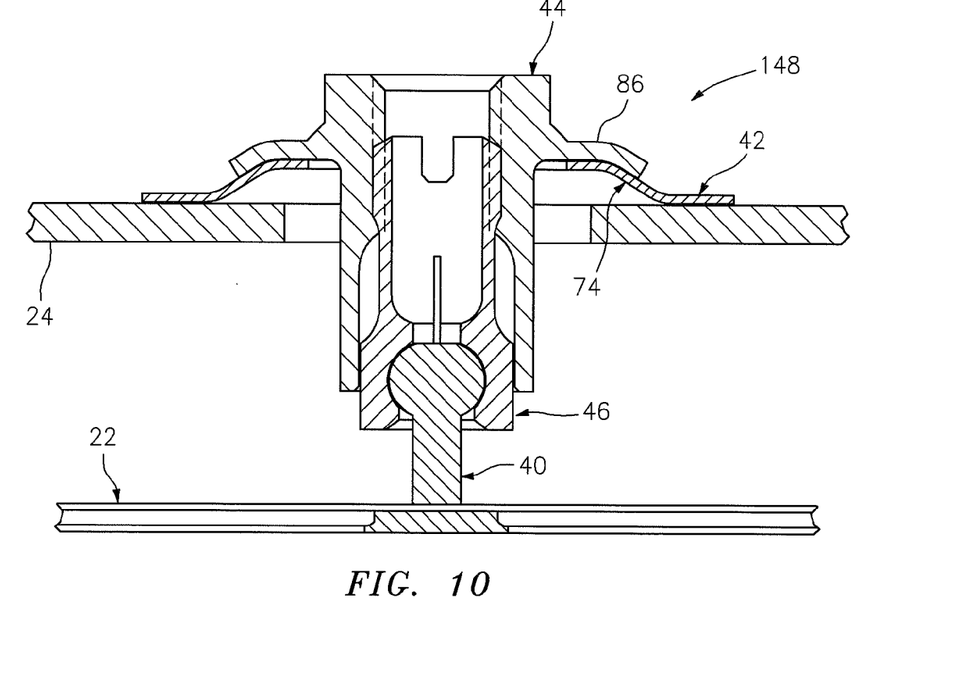
FIG. 10 is a sectional illustration of another support hanger that flexibly connects a first panel to a second panel.

FIG. 10 illustrates an alternative support hanger 148 embodiment. In contrast to the support hanger 36 of FIG. 1, the flange 86 has an arcuate cross-sectional geometry that, for example, follows a curvature of the transition segment 74 of the flexible seal 42.

A person of skill in the art will recognize the support hangers may have alternate quantities and/or configurations of torquing features, anti-rotation features and/or relief slots than those described above and/or illustrated in the drawings. The torquing features, for example, may alternatively be configured within the retainer bore. The present disclosure therefore is not limited to any particular torquing feature, anti-rotation feature and/or relief slot quantities and/or configurations. A person of skill in the art will also recognize the disclosed support hangers may be utilized for applications other than those described above. One or more of the support hangers, for example, may be utilized to connect any type of panels together that may (or may not) move relative to one another during use. The present disclosure therefore is not limited to turbine engine applications.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. A support hanger of a turbine engine, comprising:
a pin of the support hanger including a pin head;
a retainer pivotally connected to the pin head, the retainer including a seal bearing surface facing towards the pin head; and
a flexible seal including a retainer bearing surface sealingly engaging the seal bearing surface;
wherein the seal extends radially between a first seal segment and a second seal segment, and the first seal segment is radially displaced outward relative to the second seal segment; and wherein the second seal segment includes the retainer surface.

2. The support hanger of claim 1, wherein the seal further includes a transition segment that extends radially and axially between the first seal segment and the second seal segment.

3. The support hanger of claim 1, further comprising:
a collar including a threaded first collar segment and a second collar segment pivotally connected to the pin head;
wherein the retainer has a retainer bore, and the first collar segment is mated with a threaded portion of the retainer bore.

4. The support hanger of claim 3, wherein
the pin head includes a parti-spherical collar bearing surface;
the second collar segment includes a parti-spherical pin bearing surface that engages the collar bearing surface to pivotally connect the collar to the pin head; and
the pin bearing surface at least partially defines a collar bore extending axially into the collar.

5. The support hanger of claim 4, wherein the collar bearing surface is convex, and the pin bearing surface is concave.

6. The support hanger of claim 4, wherein one or more slots extend radially though a sidewall of the collar, and axially through the pin engagement segment.

7. The support hanger of claim 6, wherein
the collar includes an intermediate segment axially connecting the first collar segment and the second collar segment; and
the one or more slots extend axially into the intermediate segment to respective slot ends.

8. The support hanger of claim 3, wherein
the retainer includes a first retainer segment and a second retainer segment;
the first retainer segment includes the seal bearing surface and the threaded portion of the retainer bore; and
at least a portion of the second collar segment is nested within a portion of the retainer bore in the second retainer segment.

9. The support hanger of claim 8, wherein
the first retainer segment includes a flange and a base;
the flange extends radially out from the base and includes the seal bearing surface; and
the base includes the threaded portion of the retainer bore.

10. The support hanger of claim 9, wherein the retainer flange comprises an arcuate cross-sectional geometry.

11. The support hanger of claim 9, wherein
the retainer includes a plurality of torquing features arranged around the retainer base; and
the collar includes an anti-rotation feature arranged at an end of the first collar segment.

12. A turbine engine section, comprising:
a movable first panel of the turbine engine section;
a second panel;
a pin head fixedly connected to the first panel;
a retainer engaged pivotally to the head, the retainer including a seal bearing surface facing towards the pin head; and
an annular flexible seal engaged sealably between the seal bearing surface and the second panel;
wherein the seal extends radially between a first seal segment and a second seal segment;
wherein the first seal segment is axially displaced relative to the second seal segment, and the first seal segment axially engages the second panel; and
wherein the second seal segment includes a retainer bearing surface that sealingly engages the seal bearing surface.

13. The turbine engine section of claim 12, wherein a gas path is defined between the first and the second panel.

14. The turbine engine section of claim 13, wherein the pin head is in the gas path and the retainer projects through the second panel.

15. The turbine engine section of claim 14, wherein the second panel has a first side opposed to the first panel and an opposite second side engaged directly to the flexible seal.

16. The turbine engine section of claim 12, wherein the seal further includes a transition segment that extends radially and axially between the first and the second seal segments.

17. The turbine engine section of claim 12, further comprising:
- a collar including a threaded first collar segment and a second collar segment pivotally connected to the pin head;
- wherein the retainer has a retainer bore, and the first collar segment is mated with a threaded portion of the retainer bore.

18. The turbine engine section of claim 17, wherein
the pin head includes a parti-spherical collar bearing surface;
the second collar segment includes a parti-spherical pin bearing surface that engages the collar bearing surface to pivotally connect the collar to the pin head; and
the pin bearing surface at least partially defines a collar bore that extending axially into the collar.

\* \* \* \* \*